United States Patent [19]

Kakuta et al.

[11] Patent Number: 4,507,374
[45] Date of Patent: Mar. 26, 1985

[54] ELECTROPHOTOGRAPHIC RECORDING MEDIUM CONTAINING $\tau$ AND $\eta$ METAL-FREE PHTHALOCYANINE

[75] Inventors: Atsushi Kakuta, Hitachiohta; Hiroyuki Oka, Hitachi; Shigeo Suzuki, Hitachi; Kotaro Araya, Hitachi; Yasuki Mori, Hitachi; Hirosada Morishita, Hitachi; Shigemasa Takano; Manabu Sawada, both of Tokyo; Isao Kumano, Kawagoe, all of Japan

[73] Assignees: Hitachi, Ltd.; Toyo Ink Manufacturing Co., Ltd., both of Tokyo, Japan

[21] Appl. No.: 485,400

[22] Filed: Apr. 15, 1983

[30] Foreign Application Priority Data

Apr. 20, 1982 [JP] Japan .................. 57-66963

[51] Int. Cl.³ .................. G03G 5/06; C09B 47/04
[52] U.S. Cl. .................. 430/56; 430/58; 430/76; 260/245.72; 260/245.73; 260/245.75; 260/245.79; 260/245.81
[58] Field of Search .................. 430/76, 58, 56; 260/245.75, 245.73, 245.81, 245.79, 245.72

[56] References Cited

U.S. PATENT DOCUMENTS

| | | | |
|---|---|---|---|
| 3,640,710 | 2/1972 | Mammino et al. | 430/76 |
| 3,708,293 | 1/1973 | Brach et al. | 260/245.72 |
| 3,789,216 | 1/1974 | Komp | 260/245.72 |
| 3,816,118 | 6/1974 | Byrne | 430/76 |
| 3,992,205 | 11/1976 | Wiedemann | 430/58 |
| 4,141,904 | 2/1979 | Cabut et al. | 260/245.73 |

FOREIGN PATENT DOCUMENTS

| | | |
|---|---|---|
| 728157 | 2/1966 | Canada . |
| 1114963 | 10/1961 | Fed. Rep. of Germany . |
| 1116554 | 6/1968 | United Kingdom . |
| 1116553 | 6/1968 | United Kingdom . |

*Primary Examiner*—John E. Kittle
*Assistant Examiner*—Mukund J. Shah
*Attorney, Agent, or Firm*—Antonelli, Terry & Wands

[57] ABSTRACT

The disclosure is concerned with an electrophotographic recording medium having a layer of a photoconductive material containing at least one member selected from the group consisting of $\tau$, $\tau'$, $\eta$, and/or $\eta'$ form metal free phthalocyanine, the layer being formed on an electroconductive supporter.

The recording medium of this invention is characterized in that the recording medium exhibits high sensitivity to longer wavelength light.

15 Claims, 15 Drawing Figures

ELECTROPHOTOGRAPHIC RECORDING MEDIUM CONTAINING τ AND η METAL-FREE PHTHALOCYANINE

DESCRIPTION OF THE INVENTION

1. Field of the Invention

The present invention relates to a recording medium for electrophotography, and more particularly to an electrophotographic recording medium which exhibits a high sensitivity to longer wavelength light.

2. Background of the Invention

Heretofore, a large number of inorganic photoconductors including selenium (Se), cadmium sulfide (CdS) and zinc oxide (ZnO) and a large number of organic photoconductors including polyvinylcarbazole (PVK), perylene-pigments and disazo-pigments have been used as photoconductors for electrophotography. Any of them has a photosensitivity to the region of visible radiation suited to the visibility, and is appropriately used as the photoconductor for a copying machine or a gas laser printer. However, it has been difficult to be utilized for a laser printer having a semiconductor laser light source of which a high reliability is expected, because the sensitive wavelength region is not suited to the light source.

Gallium-aluminum-arsenic (Ga—Al—As) type light emitting elements, which have emitting wavelengths longer than about 750 nm, are extensively employed for semiconductor lasers at present. In order to guarantee a long lifetime sufficient for practical use, the emitting wavelength is restricted to at least 790 nm. Numerous studies have hitherto been made for the purpose of attaining a high sensitivity to the light of such long wavelength. By way of example, a method is considered in which a sensitizer for making it sensitive to light of longer wavelength is added to the material such as Se and CdS having a high sensitivity to the visible light. The sensitized material, however, has not been put into practical use in the points of an unsatisfactory fastness to environment attended with temperature and humidity changes and a toxicity. Also many kinds of known organic photoconductive materials have their sensitivities usually restricted to the visible light which is not longer than 700 nm, and few materials are sensitive to light of wavelengths longer than this value.

It is known that, among the materials referred to above, phthalocyanine compounds which are one sort of organic photoconductive materials have photosensitive regions extended to longer wavelengths in comparison with those of the others. As an example of the phthalocyanine compounds exhibiting photoconductivities, there is mentioned X form metal-free phthalocyanine disclosed in the Japanese Patent Publication No. 49-4338.

SUMMARY OF THE INVENTION

An object of the present invention is to provide a new recording medium for electrophotography which exhibit high sensitivities to light of longer wavelengths.

The present invention is featured by an electrophotographic recording medium which has a layer containing τ, τ', η and/or η' form metal-free phthalocyanine.

Figure 1:
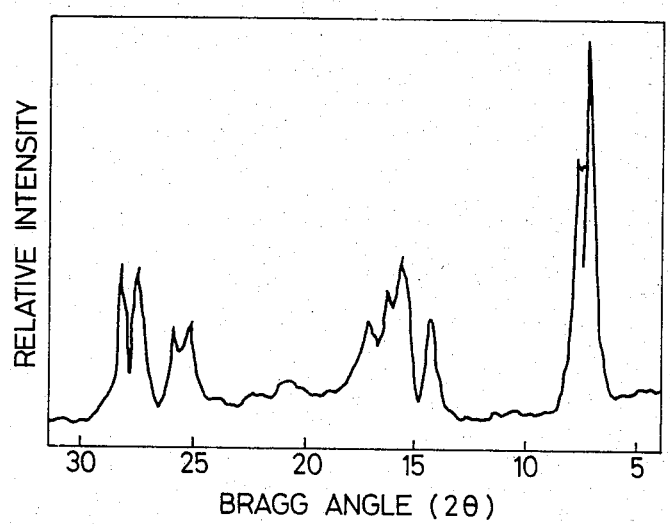
FIGS. 1 to 6 are X-ray diffraction diagrams of α form, β form X form, τ form and η form (2 sorts) of metal-free phthalocyanines, respectively.
Figure 2:
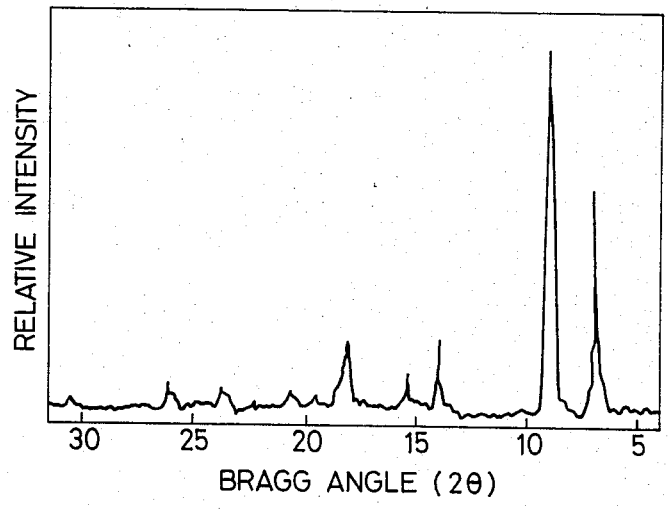
Figure 3:
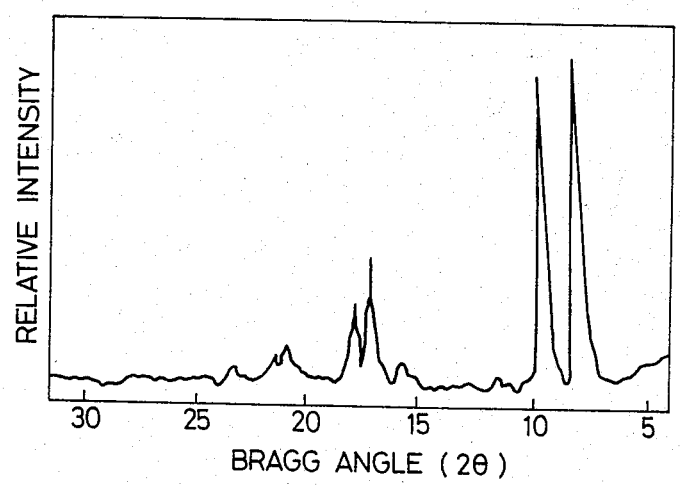
Figure 4:
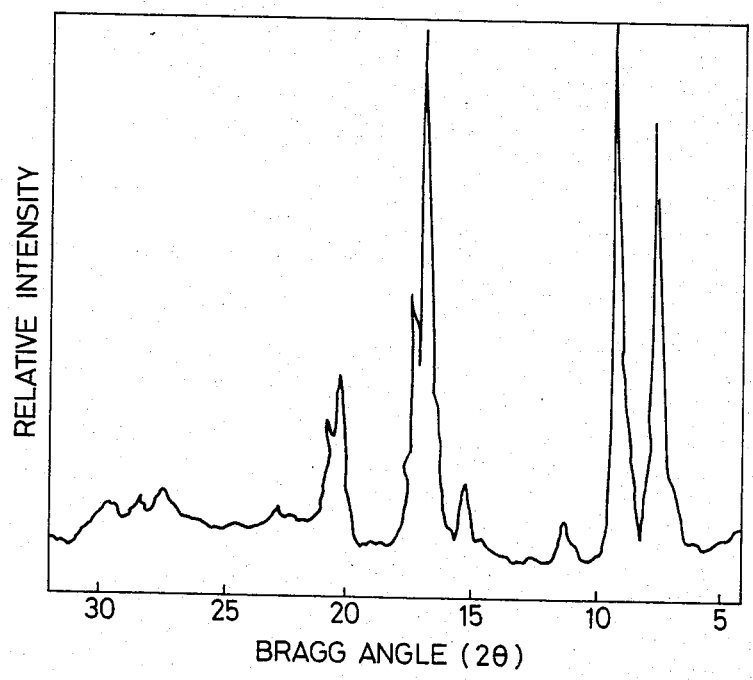

DETAILED DESCRIPTION OF THE INVENTION (1) Metal-free phthalocyanine

The τ form metal-free phthalocyanine is defined as follows: It is a material exhibiting an X-ray diffraction pattern which has characteristic lines at Bragg angles ($2\theta \pm 0.2$ degrees) of 7.6, 9.2, 16.8, 17.4, 20.4 and 20.9 Particularly desirable is a material the infrared absorption spectrum of which has four absorption bands between 700 and 760 $cm^{-1}$, the absorption band at $751 \pm 2$ $cm^{-1}$ being the intensest, two absorption bands of substantially equal intensities between 1320 and 1340 $cm^{-1}$, and characteristic absorption at $3288 \pm 3$ $cm^{-1}$.

The τ' form metal-free phthalocyanine may be called a modified τ form metal-free phthalocyanine and exhibits an X-ray diffraction pattern which has strong diffraction lines at Bragg angles ($2\theta \pm 0.2$ degrees) of 7.5, 9.1, 16.8, 17.3, 20.3, 20.8, 21.4 and 27.4.

A preferable τ' form metal-free phthalocyanine is characterized by the infrared absorption spectrum which has four strong absorption bands between 700 and 760 $cm^{-1}$, the absorption band at $753 \pm 2$ $cm^{-1}$ being strongest, and has two absorption bands between 1320 and 1340 $cm^{-1}$. The modified τ form phthalocyanine has a characteristic absorption at $3297 \pm 3$ $cm^{-1}$.

The η form metal-free phthalocyanine is defined as follows: It is a material comprising 100 parts by weight of metal-free phthalocyanine, and at most 50 parts by weight of one of, or a mixture of at least two of, metal-free phthalocyanines which have substituents for benzene nuclei, or porphin type compounds which are defined as porphin derivatives with one, two, three or four aza groups joining the pyrrole nuclei, with one or more inorganic-organic groups replacing the β-hydrogen atoms (hereinafter referred to as "porphin type compounds"), or metal phthalocyanines which may have substituents for benzene nuclei. The infrared absorption spectrum of the mixture crystal has four absorption bands between 700 and 760 $cm^{-1}$, the absorption band at $753 \pm 1$ $cm^{-1}$ being the strongest, two absorption bands of substantially equal intensities between 1320 and 1340 $cm^{-1}$, and characteristic absorption at $3285 \pm 5$ $cm^{-1}$. According to the inventors' study, as the η form metal-free phthalocyanine, there are especially mentioned a material having an X-ray diffraction pattern which exhibits characteristic lines at Bragg angles ($2\theta \pm 0.2$ degrees) of 7.6, 9.2, 16.8, 17.4 and 28.5, and a material having an X-ray diffraction pattern which exhibits characteristic lines at 7.6, 9.2, 16.8, 17.4, 21.5 and 27.5.

The η' form metal-free phthalocyanine may be called a modified η form metal free phthalocyanine and has the same infrared absorption bands as the η form metal free phthalocyanine, while the characteristic absorption band thereof is at $3297 \pm 5$ $cm^{-1}$.

The η' form phthalocyanine exhibits strong lines of Bragg's angle (2θ±0.2 degrees) at 7.5, 9.1, 16.8, 17.3, 20.3, 20.8, 21.4 and 27.4. There is another type of η' form metal free phthalocyanine which exhibits strong lines at Bragg angles (2θ±0.2 degrees) of 7.5, 9.1, 16.8, 17.3, 20.3, 20.8, 21.4, 22.1, 27.4 and 28.5.

The τ, τ', η and η' form metal-free phthalocyanines have the maximum values of photosensitive wavelength regions in a range of 790–810 nm.

Another charge generating substance can be incorporated into the aforementioned τ, τ', η and/or η' form metal-free phthalocyanine. As an example of such charge generating substance, there is mentioned α form, β form, τ form or X form metal-free phthalocyanine. It is also effective to jointly use known charge generating substances other than mentioned above, such as metal phthalocyanine pigments, azo pigments, anthraquinone pigments, indigoid pigments, quinacridone pigments, perylene pigments, polycyclic quinone pigments and methyne squarate pigments. As examples of the azo pigments, there are mentioned a disazo pigment such as:

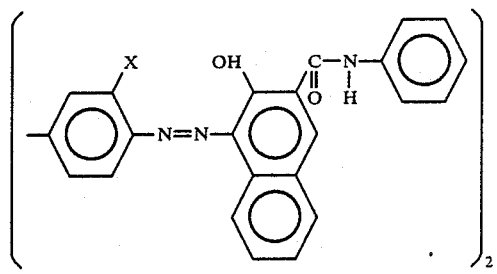

(where X denotes OCH₃ or Cl) and a monoazo pigment such as:

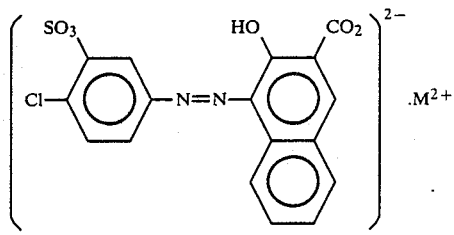

(where M denotes Ca, Mg or Ba).

The electrophotographic recording medium contains τ, τ', η and/or η' form metal-free phthalocyanine which is obtained by dispersing metal-free phthalocyanine in a liquid dispersant, and heating the dispersed system to a temperature lower than a decomposition temperature of the phthalocyanine, thereby applying mechanical shearing forces to the dispersed phthalocyanine particles, to change a crystalline structure thereof. Especially in obtaining the τ or τ' form metal-free phthalocyanine, the α form metal-free phthalocyanine should desirably be subjected to milling by agitation or with a mechanical stress at 50°–180° C. for a period of time sufficient to change the crystalline structure. In obtaining the η or η' form metal-free phthalocyanine, a mixture consisting of 100 parts by weight of metal-free phthalocyanine, particularly the α form metal-free phthalocyanine, and at most 50 parts by weight of one of, or a mixture of at least two of, metal-free phthalocyanines which have substituents for benzene nuclei, or porphin type compounds or metal phthalocyanines which may have substituents for benzene nuclei, should desirably be subjected to milling by agitation or with a mechanical stress at 30°–220° C., preferably 60°–130° C. for a period of time sufficient to change the crystal form. The metal-free phthalocyanine as the raw material can be properly selected from among the α form, β form, τ form etc., but the desired crystal form is obtained by changing a crystal form via the α form anyway.

The photoconductor layer for electrophotography can be made of a charge generating substance and a charge transport substance. The layer is disposed on an electroconductive supporter.

As the charge transport substance, there is employed any of photoconductive low-molecular-weight compounds, photoconductive high-molecular-weight compounds, and materials containing such dyes as cyanine dyes, as will be mentioned later. Particularly desirable as such composite photoconductor electrophotography is one wherein a layer made of the charge generating substance is formed on the electroconductive supporter and is further overlaid with a layer made of the charge transport substance. Desirably the charge transport substance is a compound whose ionization potential ($I_p$) is not greater than 6.6 eV. Especially the τ, τ', η or η' form metal-free phthalocyanine is difficult to attain a high sensitivity as a photoconductor for electrophototraphy for the reason that, since carriers are generated by the low energy of longer wavelength light, they are impeded by energy barriers when conventional charge transport substances are used. By employing as the charge transport substance the compound having the $I_p$ not greater than 6.6 eV, the injection of the low energy carriers is smoothed and the high sensitivity can be realized.

(2) Manufacturing Method and Characteristics of τ and τ' form Metal-free Phthalocyanines:

The τ form metal-free phthalocyanine has an X-ray diffraction pattern which exhibits intense lines at Bragg angles (2θ±0.2 degrees) of 7.6, 9.2, 16.8, 17.4, 20.4 and 20.9. Similarly, τ' form metal-free phthalocyanine has intense lines at Bragg angles (2θ±0.2 degrees) of 7.5, 9.1, 16.8, 17.3, 20.3, 20.8 and 27.4. The typical manufacturing method thereof is featured by the form metal-free phthalocyanine which is subjected to milling by agitation or with a mechanical stress at 50°–180° C., preferably 60°–130° C. for a period of time sufficient to produce the τ or τ' form. The X-ray diffraction and the infrared spectrum are indicated with ranges, depending upon how lattice defects or transformation in the crystal are formed, etc., which in turn depend upon different conditions in the manufacture. The Bragg angles 2θ were measured in the wavelength 1,541 Å of CuKα/Ni by means of an X-ray powder diffraction instrument.

FIGS. 1 to 4 and FIG. 13 are X-ray diffraction diagrams of the α form, β form, X form and τ form and τ' form crystals of metal-free phthalocyanines, respectively. The X-ray diffraction diagram of the X form metal-free phthalocyanine has been reproduced from the Japanese Patent Publication No. 44-14106 entitled "Method of Manufacturing X form Metal-free Phthalocyanine". Since the γ form corresponds to the α form metal-free phthalocyanine of inferior crystallinity and is close to amorphism, it is not illustrated in the drawing.

When the X-ray diffraction diagram of the τ or τ' form metal-free phthalocyanine is compared with those of the other crystal forms, it has apparent differences from those of the α form and the β form, and it is quite different at great Bragg angles of and above 20.0 even from the comparatively similar diffraction diagram of the X form. In the diffraction pattern of the τ form (or τ' form), definite diffraction lines appear near 20.4 and 20.9 (or 20.3, 20.8, 21.4 and 27.4), and quite no diffraction line appears at 22.1 at which a diffraction line appears in the diffraction diagram of the X form. On the other hand, in the diffraction diagram of the X form, diffraction lines at 20.4 and 20.9 (or 20.3, 20.8, 21.4 and 27.4) are not observed. Moreover, the τ or τ' form demonstrates the diffraction pattern which is so intense and sharp as corresponds to that of the β form, and which is beyond comparison with those of the α, β and X forms of inferior crystallinities. It is accordingly understood that the τ or τ' form has a stable good crystallinity.

In addition, the τ or τ' form metal-free phthalocyanine is clearly distinguished from the other crystal forms on the basis of the measurement of infrared absorption spectra.

Table 1 shows comparisons among the infrared absorption spectra of the metal-free phthalocyanines of the respective crystalline structures. The spectra of the α, β and X forms have been reproduced from "Spectroscopic Characterization of new polymorph of Metal Free Phthalocyanine" published by Messrs. J. H. Sharp and M. Lardon in J. Phys. Chem., Vol. 27, 3230 (1968). The infrared absorption spectra of the τ, τ', η and η' form metal-free phthalocyanines have been actually measured.

In Table 1, the unit of numerals is cm$^{-1}$. The intensities of absorption are expressed by "weak" ... w, "medium" ... m and "strong" ... s. Symbol "sh" indicates a shoulder.

As apparent from Table 1, the absorption wave numbers of the τ and τ' form metal-free phthalocyanines at 700–800 cm$^{-1}$ differs from any of those of the α, β and X forms. Moreover, the τ and τ' form metal-free phthalocyanines are conspicuously different in the absorption wave number near 3300 cm$^{-1}$ from the X form which is comparatively similar in the X-ray diffraction pattern to the τ form and τ' form.

clude lithium phthalocyanine, sodium phthalocyanine, calcium phthalocyanine, magnesium phthalocyanine, etc. The α form phthalocyanine is produced directly from phthalodinitrile, aminoiminoisoindolenine, alkoxyiminoisoindolenine, etc. The metal-free phthalocyanine, which is obtained by the method already well known, is dissolved in sulfuric acid to produce a sulfate of the metal-free phthalocyanine desirably at 5° C. or below. The solution or dispersion of the sulfate is poured into water or iced water to reprecipitate the phthalocyanine or hydrolyze the sulfate, whereby the α form metal-free phthalocyanine is obtained. While the α form metal-free phthalocyanine thus treated is preferably used in a dry state, it is also used in an aqueous paste state. Dispersing media for kneading may be materials which are usually employed for the dispersion of pigments, mixing for emulsification, etc. For example, there are mentioned glass beads, steel beads, alumina balls, and flintstone. The dispersing media, however, are not essential for the production of the metal free phthalocyanines. A grinding aid may be any of materials which are usually used as the grinding aids of pigments, and which include, for example, sodium chloride, sodium hydrogen carbonate and sodium sulfate. The grinding aid, however, is not essential, either.

In a case where the dispersant is used, one which is liquid at temperatures during the agitation and kneading is favorable. One or more dispersants are preferably selected from alcohol type dispersants, namely, glycerine, ethylene glycol, diethylene glycol and polyethylene glycol type dispersants; cellosolve type dispersants such as ethylene glycol monomethyl ether and ethylene glycol monoethyl ether; ketone type dispersants; ester ketone type dispersants; etc.

Typical devices for carrying out the crystal transformation process are ordinary agitating devices, for example, a homomixer, a disperser, an agitator, a stirrer, a kneader, a Banbury mixer, a ball mill, a sand mill and an attritor.

The crystal transformation process is performed in a temperature range of 50°–180° C., preferably 60°–130° C. It is also an effective method to use seeds as in conventional crystal transformation processes.

TABLE 1

| α form | β form | χ form | τ form | τ' form | η form | η' form |
|---|---|---|---|---|---|---|
| 714 (s–m) | | | 717 ± 1 (s) | 718 (s) | 718 ± (s) | 718 ± 1 (s) |
| | | 720 (s) | | | | |
| | 724 (s) | | 730 ± 1 (s–m) | 731 (s–m) | 731 ± 1 (s–m) | 731 ± 1 (s–m) |
| 733 (s) | 733 (s–m) | 734 (s–m) | 736 ± 1 (s–m) | 737 (s–m) | 736 ± 1 (s–m) | 737 ± 1 (s–m) |
| 738 (s) | 739 (s–m) | 739 (s–m) | | | | |
| 743 sh (m) | | | | | | |
| | 755 (s) | 755 (s) | 752 ± 1 (s) | 753 (s) | 753 ± 1 (s) | 753 ± 1 (m) |
| 767 (w–m) | | | 769 ± 1 (m–w) | 771 ± 1 (m) | 769 ± 1 (m–w) | 771 ± 2 (m–w) |
| | 772 (s) | 772 (s) | | | | |
| | 782 (m) | 784 (w) | 783 ± 1 (w) | 784 sh (w) | 784 ± 1 (w) | 784 ± 1 sh (w) |
| | | 1318 (s) | | | | |
| 1321 (s) | 1323 (s) | | | 1322 (s) | 1321 ± 1 (s) | 1322 ± 1 (s) |
| | | 1330 (s) | | 1335 (s) | | |
| 1336 (s) | 1334 (s) | | | | 1334 ± 1 (s) | 1335 ± 1 (s) |
| 3302 (w) | 3284 (m) | 3302 (w–m) | 3288 ± 5 (m) | 3297 ± 3 (m) | 3285 ± 5 (m) | 3297 ± 5 (m) |

As the α form phthalocyanine which is the raw material for the τ and τ' type metal-free phthalocyanines, there is used any of materials produced by known methods described in, e.g., "Phthalocyanine Compounds" by Moser and Thomas, or produced by other suitable methods. For example, metal-free phthalocyanines to be used are produced by the acid treatments of metal phthalocyanines from which metals can be removed with acids such as sulfuric acid. The metal phthalocyanines in- The rate of the crystal transformation to the τ or τ' form greatly depends upon the efficiency of agitation, the strength of a mechanical force, the size of the particles of a raw material, and the temperature of the processing. The theoretical analysis of the rate, however, is very complicated.

After the end of the crystal transformation process, the powder of the desired τ or τ' form metal-free phthalocyanine crystal can be obtained merely by removing the aid, the organic solvent etc. by conventional processes for purification, followed by drying. The $\tau$ or $\tau'$ form metal-free phthalocyanine thus produced is purified by boiling in acetone, tetrahydrofuran or ethyl acetate for a period of time not shorter than 3 hours, without causing change of the crystalline structure. Particularly, the $\tau$ or $\tau'$ form metal-free phthalocyanine is very stable even in aromatic solvents by which a solvent-unstable form such as $\alpha$ form phthalocyanine is readily changed into the $\beta$ form. For example, even in a case where it is boiled in toluene at 100° C. for a period of time not shorter than 3 hours, the transformation of the crystalline structure was not observed. In addition, the $\tau$ or $\tau'$ form metal-free phthalocyanine is excellent in heat resistance, and even when it is let stand in the air at 150° C. for 50 hours or more, the transformation of the crystalline structure was not observed. Further, the $\tau$ or $\tau'$ form metal-free phthalocyanine will not loose its photosensitive characteristics when it is dispersed in the solution of a binding agent.

As thus far described, the $\tau$ or $\tau'$ form metal-free phthalocyanine has the novel crystal form of excellent crystallinity, stable heat resistance and excellent resistance to solvents.

(3) Manufacturing Method and Characteristics of $\eta$ and $\eta'$ form Metal-free Phthalocyanines:

The $\eta$ and $\eta'$ form metal-free phthalocyanines shall designate, not only pure metal-free phthalocyanines, but also mixtures thereof with other phthalocyanines.

The $\eta$ and $\eta'$ form metal-free phthalocyanines are a mixture of crystal comprising 100 parts by weight of $\alpha$ form metal-free phthalocyanine, and at most 50 parts by weight of one of, or a mixture of at least two of, metal-free phthalocyanines which have substituents for benzene nuclei, or porphin type compounds or metal phthalocyanines which may have substituents for benzene nuclei. The $\eta$ or $\eta'$ form phthalocyanine is novel polymorph of metal-free phthalocyanines whose infrared absorption spectrum has four absorption bands between 700 and 760 cm$^{-1}$, the absorption band at $753\pm1$ cm$^{-1}$ being the intensest, two absorption bands of substantially equal intensities between 1320, and 1340 cm$^{-1}$. The characteristic absorption of $\eta$ form is at $3285\pm5$ cm$^{-1}$ and of $\eta'$ form at $3297\pm5$ cm$^{-1}$. The manufacturing method for the polymorphs is characterized in that the aforementioned mixture is milled by agitation or with a mechanical stress at 30°-220° C., preferably 60°-130° C. for a period of time sufficient to change the crystalline structures of the raw materials into the $\eta$ or $\eta'$ form. The fact that the X-ray diffraction and infrared spectrum of the $\eta$ or $\eta'$ type have certain latitudes, and the method of measuring the Bragg angles is the same as described on the foregoing $\tau$ or $\tau'$ form metal-free phthalocyanine. As apparent from Table 1 mentioned before, the absorption wave number of the $\eta$ and $\eta'$ form metal-free phthalocyanines at 700-800 cm$^{-1}$ is different from any of those of the $\alpha$, $\beta$ and X forms. In addition, the $\eta$ and $\eta'$ form are remarkably different in the absorption wave number near 3300 cm$^{-1}$ from the X form.

Figure 5:
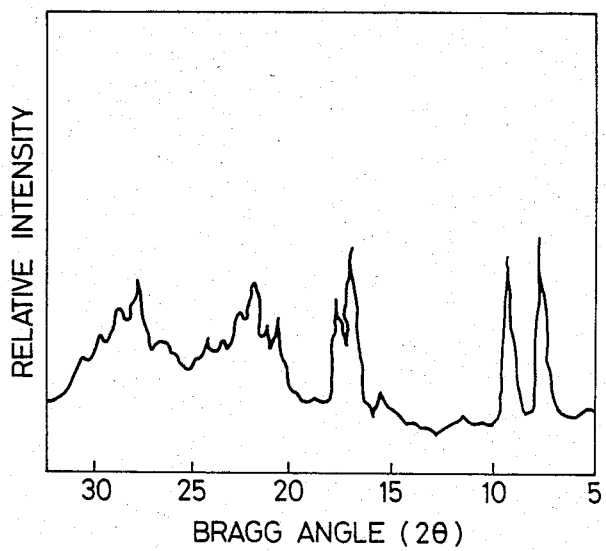
Figure 6:
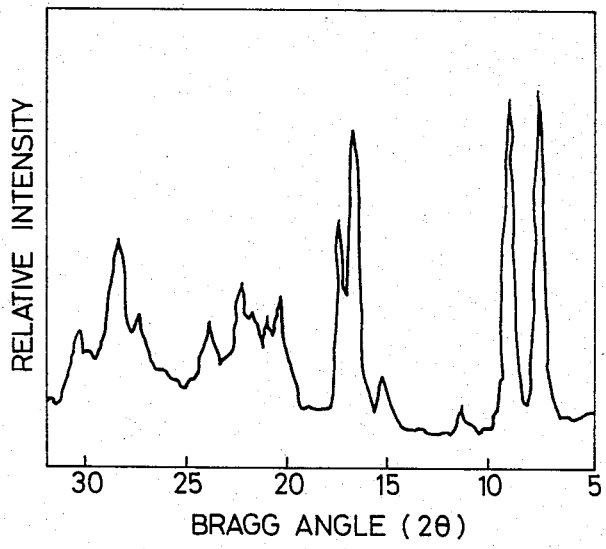
Figure 14:
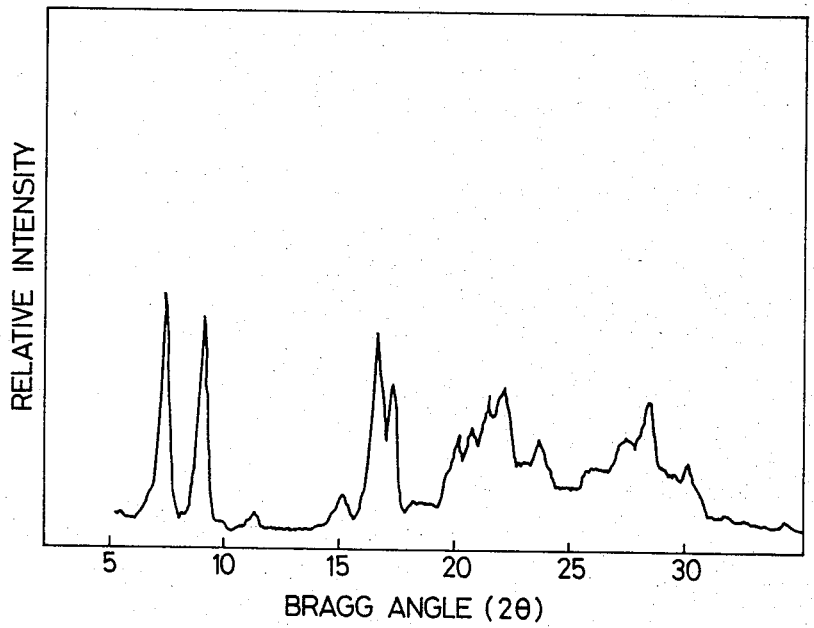
Figure 15:
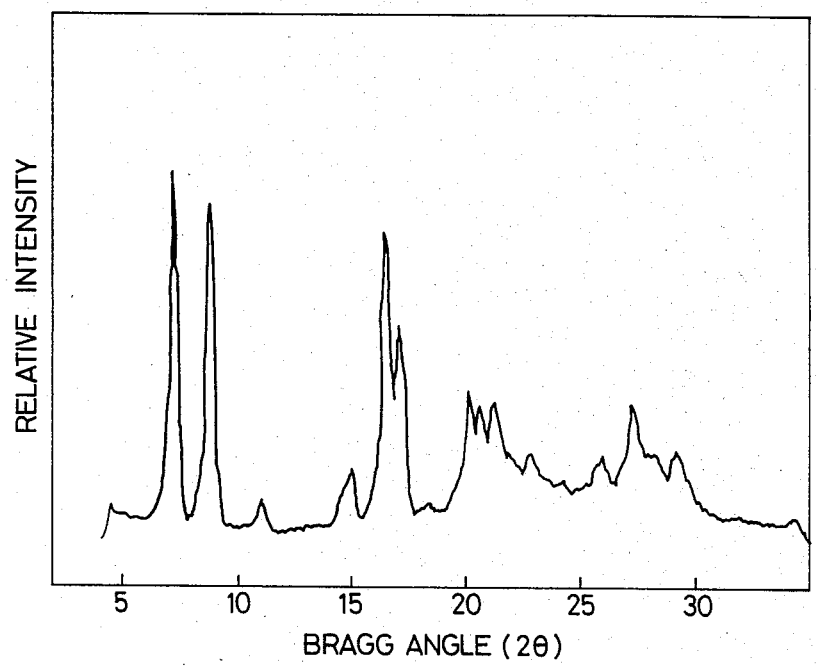

FIGS. 5 and 6 are X-ray diffraction patterns of two sorts of $\eta$ form metal-free phthalocyanine and FIGS. 14 and 15 are ones of $\eta'$ form metal free phthalocyanine. The reason whey the two patterns are illustrated as to the form, is that materials whose infrared absorption spectra are the same but whose X-ray diffraction patterns differ at higher Bragg angles are produced depending upon manufacturing conditions. Since these materials exhibit the same infrared absorption spectra, the difference is thought to come from the directivity of the growth of a crystal face, and both can be regarded as the $\eta$ form or $\eta'$ form.

When the X-ray diffraction diagram of the $\eta$ or $\eta'$ form metal-free phthalocyanine is compared with those of the other crystal forms, it has apparent differences from those of the $\alpha$ form and the $\beta$ form, and it is quite different at Bragg angles of and above 20.0 even from the comparatively similar diffraction diagram of the X form. In the diffraction pattern of the $\eta$ form (or $\eta'$ form), definite diffraction lines appear near 28.5 or 21.5 and 27.5 (or 28.5, or 21.4 and 27.4). On the other hand, in the diffraction diagram of the X type, diffraction lines at 28.5 or 21.5 and 27.5 (or 28.5, or 21.4 and 27.4) are not observed. Moreover, the $\eta$ form or $\eta'$ form demonstrates the diffraction pattern which is so intense and sharp as corresponds to that of the $\beta$ form. It is thus understood that the $\eta$ form or $\eta'$ form has a stable and good crystallinity beyond comparison with those of the $\alpha$, $\beta$ and X forms of inferior crystallinities.

The $\alpha$ form phthalocyanine, and the metal-free phthalocyanine having substituents for benzene nuclei, or the porphin type compounds or metal phthalocyanine allowed to have substituents for benzene nuclei, which are used in manufacturing the $\eta$ form metal-free phthalocyanine, are produced by the foregoing known methods taught by Moser and Thomas or produced by other suitable methods, likewise to the case of the $\tau$ form or $\tau'$ form.

As the porphin type compounds, for example, copper tetrapyridinoporphyrazine can be used. As the metal phthalocyanine, there can be mentioned various sorts of copper (Cu), nickel (Ni), cobalt (Co), zinc (Zn), tin (Sn), aluminum (Al), etc. As the substituents, there are the amino group, alkyl group, alkoxy group, cyano group, mercapto group, halogen atoms, etc. Further, the sulfonic group, the carbonic group or a metal salt, an ammonium salt, an amine salt thereof, etc. can be exemplified as comparatively simple materials. Moreover, various substituents can be introduced into the benzene nuclei through the alkylene group, sulfonyl group, carbonyl group, imino group, etc. These may be materials hitherto known as antiaggregants or agents preventive of crystal transformation in the technical field of phthalocyanine pigments (refer to, e.g., the specification of U.S. Pat. Nos. 3,973,181 or 4,088,507) or the like. Known methods of introducing the respective substituents shall be omitted from the description. Methods which have not been known will be described as reference examples in embodiments later.

The mixing proportion of the $\alpha$ form metal-free phthalocyanine and the metal-free phthalocyanine having substituents for benzene nuclei or the porphin type compounds or metal phthalocyanine allowed to have substituents for benzene nuclei may be at least 100/50 (weight ratio). Preferably, it is set at 100/30-100/0.1 (weight ratio). Even above this ratio, the photosensitive characteristics of the $\eta$ or $\eta'$ form crystals produced may be effective.

In order to mix the materials at the proportion as mentioned above, they may be merely mixed, or they may be mixed before the acid pasting of the $\alpha$ form metal-free phthalocyanine. A method of agitating or milling the mixture thus prepared may be the same as in the production of $\tau$ or $\tau'$ form phthalocyanine.

The crystal transformation process is performed in a temperature range of 30°–220° C., preferably 60°–130° C. At higher temperatures, the raw materials are liable to change into the $\beta$ form, whereas at lower temperatures, the transformation to the $\eta$ or $\eta'$ form takes a long time. It is also an effective method to use crystallization seeds as in conventional crystal transformation processes.

Treatments after the end of the crystal transformation process are the same as described on the $\tau$ form crystal.

The crystal stability of the $\eta$ or $\eta'$ form metal-free phthalocyanine against solvents is similar to that of the $\tau$ or $\tau'$ form metal-free phthalocyanine. In addition, the $\eta$ or $\eta'$ form metal-free phthalocyanine is excellent in heat resistance, and even when it is let stand in the air at 200° C. for 50 hours or more, the transformation of the crystalline structure was not observed.

Figure 7:
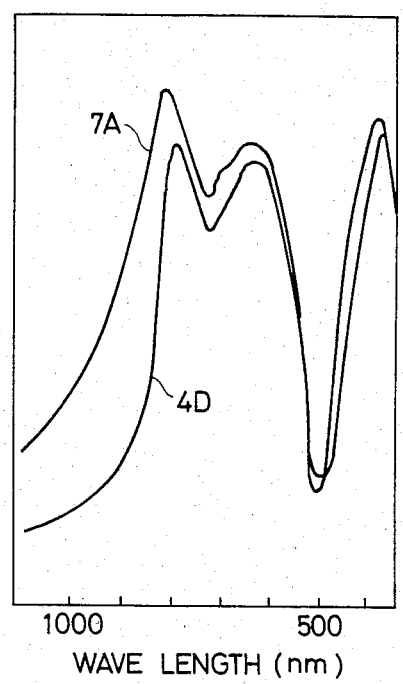
FIG. 7 is a radiation absorption spectrum diagram of η form metal-free phthalocyanine.

Moreover, the adjustment of a subtle spectral response of the $\eta$ or $\eta'$ form metal-free phthalocyanine can be made by selecting the kinds and quantities of various derivatives which are incorporated into the $\eta$ or $\eta'$ form metal-free phthalocyanine. For instance, 1 part by weight of $\eta$ or $\eta'$ form metal-free phthalocyanine obtained by Example 4-D or 7-A to be described later and 100 parts by weight of polyester resin (Vylon 200) were dispersed in a toluene solution. The resultant solution was applied on glass plate and then dried, to obtain a colored film. The absorption spectrum of the colored film was measured to obtain the result shown in FIG. 7, from which the change of spectra will be understood.

As thus far described, the $\eta$ or $\eta'$ form metal-free phthalocyanine has the novel crystal form of excellent crystallinity, subtle spectral response, stable heat resistance and excellent resistance to solvents.

(4) Manufacturing Method and Characteristics of Electrophotographic Recording Medium of the Present Invention Since the $\tau$ or $\tau'$ form metal-free phthalocyanine exhibits the maximum sensitivity at 790–810 nm, it is the most suitable as a photoconductor for electrophotography using a semiconductor laser. Further, the $\eta$ or $\eta'$ form metal-free phthalocyanine has the very stable crystalline structure, which undergoes no transformation to any other crystalline structure even when dispersed in the organic solvents of acetone, tetrahydrofuran, ethyl acetate, etc. Even when subjected to such a heat test in the air at 200° C. for a period of time not shorter than 50 hours, the $\eta$ or $\eta'$ form is stable. These properties are great merits in the manufacture and use of the photoconductor for electrophotography.

The electrophotographic recording medium may be manufactured by coating a mixed layer which is made of the new metal-free phthalocyanine and a resin as a binding agent on an electrically-conductive substrate of aluminum or the like. The binder resins include a phenol resin, urea resin, melamine resin, furan resin, epoxy resin, silicone resin, vinyl chloride-vinyl acetate copolymer, xylene resin, toluene resin, urethane resin, vinyl acetate-methylmethacrylate copolymer, acrylic resin, polycarbonate, cellulosic derivative, etc. These binders are properly selected and used. Further utilized as the binders are high molecular weight compounds which have in their side chains a carbazole ring and anthracene ring, such as poly-N-vinyl carbazole and poly-9-p-vinyl phenyl-anthracene exhibitive of photo-conductivites. The high molecular weight compounds are one which have in their side chains such other heterocycle and aromatic ring as the pyrazoline ring and dibenzothiophene ring. These photoconductive high-molecular-weight compounds can serve as charge transport substances.

The mixing proportion between the new metal-free phthalocyanine and the binder resin should suitably be 20–200 parts by weight of phthalocyanine with respect to 100 parts by weight of resin. However, in a case where a sensitizer or a charge transport material coexists, the $\tau$ or $\tau'$ form metal-free phthalocyanine can be reduced down to about 1 part by weight. With an amount of below 1 part by weight, the feature of the $\tau$ or $\tau'$ form metal-free phthalocyanine does not appear in the sensitivity or photosensitive wavelength region of the electrophotographic recording medium. On the other hand, with an amount of above 200 parts by weight, a mechanical strength and a dark retentivity (capability of retaining charges in the dark) sufficient for the electrophotographic recording medium cannot be expected. The thickness of the mixed layer containing the $\tau$ or $\tau'$ form metal-free phthalocyanine should suitably be 5–50 $\mu$m.

Regarding the photosensitivity of the electrophotographic recording medium according to one embodiment of the present invention, the half-value exposure sensitivity (light energy required for reducing a surface potential by half) for white light is 4 to 5 lux·s (lux·second) when any special sensitizer or charge transport material is not incorporated, that is, when the photoconductor is such that the $\tau$ or $\tau'$ form metal-free phthalocyanine is merely mixed in the ordinary binder resin. In this case, a very high sensitivity is attained which is 20 mJ/m$^2$ or less in terms of the half-value exposure for the monochromatic light of 800 nm.

Heretofore, in such longer wavelength region as 800 nm, the half-value exposure has usually been 100 mJ/m$^2$ or above. It is accordingly understood that the electrophotographic recording medium according to the present invention is suited to semiconductor lasers.

The $\eta$ or $\eta'$ form metal-free phthalocyanine for use in the present invention is an inexpensive and unpolluting material easy of synthesis. It can be also pointed out that the material can be formed in various shapes, such as a flexible film and a drum, in conformity with purpose by the joint use with the binder resin, so the property of handling is very excellent as photoconductors for printers.

An electrophotographic recording medium employing the $\eta$ or $\eta'$ form metal-free phthalocyanine is similarly manufactured, and exhibits similar characteristics.

(5) Manufacturing Method and Characteristics of Composite Electrophotographic Photoconductor of the Present Invention A charge transport layer is further formed on the electrophotographic photoconductor stated in the preceding item, whereby a composite electrophotographic recording medium is obtained. In case of adopting such stacked structure, the layer of the $\tau$ or $\tau'$ form metal-free phthalocyanine (that is, the charge generating layer) can be thinned down to approximately 0.1 $\mu$m and used. The charge transport layer may well be formed under the charge generating layer containing the $\tau$ or $\tau'$ form metal-free phthalocyanine (that is, between the electrically-conductive substrate and the charge generating layer). As the charge transport material, there are employed various photoconductive high-molecular-weight compounds indicated in the preceding item. Further, the charge transport layer can be formed by mixing into an ordinary resin any of the known photoconductive low-molecular-weight compounds including, for example, cyanine dye bases, oxadiazol derivatives, pyrazoline derivatives, hydrazone type compounds, poly-N-vinylcarbazole, triphenylmethane type compounds, triphenylamine type compounds, and nitrofluorenone such as 2,4,7-trinitrofluorenone. As examples of the cyanine dye bases, there are mentioned:

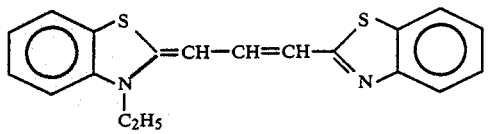

and

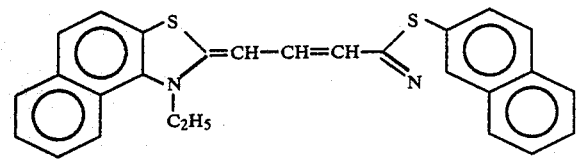

The oxadiazol derivative is, for example:

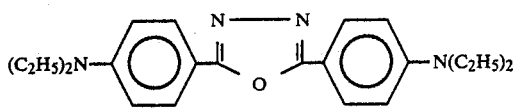

The pyrazoline derivative is, for example:

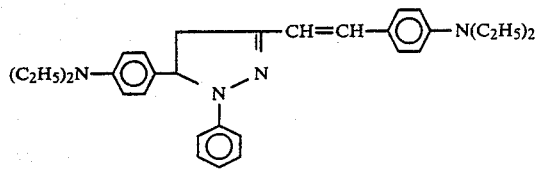

By adopting the composite photoconductor structure in which the charge transport layer is stacked as described above, the half-value exposure for white light can reach 1 to 2 lux·s or below, and the half-value exposure for the monochromatic light of 800 nm can reach B 10 mJ/m² or below. A composite electrophotographic recording medium which employs a charge generating layer containing the η or η' form metal-free phthalocyanine is similarly manufactured, and exhibits similar characteristics.

In fabricating the composite electrophotographic recording medium of the present invention, the layer of the charge generating substance is formed on the electroconductive supporter, and the layer of the charge transport substance is further formed thereon. Alternatively, the layer of the charge generating substance may be formed on the layer of the charge transport substance.

The layer of the charge generating substance can be formed by a method wherein the τ or τ' form metal-free phthalocyanine alone or a system with this phthalocyanine mixed with a binder resin is dispersed and mixed by a ball mill, a roll mill or the like so as to become fine (at most 5 μm, especially at most 1 μm in particle size), and the resultant coating liquid is applied by a coating operation. Although the thickness of the layer of the charge generating substance differs depending upon a required sensitivity and the mixing proportion between the τ or τ' form metal-free phthalocyanine and the binder resin, it is usually 20 μm or less, preferably 0.1–3 μm. When the thickness of the layer is great, not only the sensitivity lowers, but also the flexibility of the layer is lost, due to which the layer might strip off. The τ or τ' form metal-free phthalocyanine and the binder resin are preferably compounded at a ratio of at most 4 parts by weight of the latter with respect to 1 part by weight of the former. When this ratio is exceeded, the sensitivity exhibits the tendency of lowering gradually.

The formation of the layer of the charge transport substance is also performed by a coating operation. The layer of the charge transport substance requires a binder resin in order to bestow a mechanical strength as a film thereon. The charge transport substance and the binder resin are dissolved by the use of an organic solvent which can dissolve both, and the resultant solution is used as a coating liquid. While the thickness of the layer of the charge transport substance is determined by a charging characteristic required as the photoconductor, it is usually set at 5–100 μm, preferably 8–30 μm. The compounding proportion between the charge transport substance and the binder resin should suitably be set within a range of 0.5–4 parts by weight of the latter with respect to 1 part by weight of the former.

The electrically-conductive supporter is made of any of brass, aluminum, gold, copper etc., which may be in the shape of a sheet, thin plate or cylinder having a suitable thickness, hardness or flexibility and which may be covered with a thin layer of plastics. The supporter may well be glass which is covered with a metal coating, a metallized plastic sheet, or a thin layer of aluminum iodide, copper iodide, indium oxide or tin oxide. Usually the supporter is electrically conductive in itself or has an electrically-conductive surface. It is desired to have a strength sufficient for handling.

(6) Examples, Reference Examples and Comparative Example ("Parts" indicate part(s) by weight.):

REFERENCE EXAMPLE 1

14.5 parts of aminoiminoisoindolenine were heated in 50 parts of trichlorobenzene at 200° C. for 2 hours so as to react with the latter. After removing the solvent by steam distillation, the reaction product was purified with a 2% aqueous solution of hydrochloric acid and then with a 2% aqueous solution of sodium hydroxide. The purified product was sufficiently washed with water, and was thereafter dried. Thus, 8.8 parts of metal-free phthalocyanine (yield percentage: 70%) were obtained. The metal-free phthalocyanine produced in this way had the crystal form of the β form. The transition from the β form to the α form was carried out by the following operations. In 10 parts of 98% sulfuric acid held at or below 10° C., 1 part of the β form metal-free phthalocyanine was dissolved little by little. The resultant mixture was agitated for about 2 hours while the temperature was held at or below 5° C. Subsequently, the sulfuric acid solution was poured into 200 parts of iced water, and a precipitated crystal was filtered. The crystal was wahsed with distilled water until no acid was left, and the washed crystal was dried. Then, 0.95 part of α form metal-free phthalocyanine was obtained.

EXAMPLE 1

10 parts of α form metal-free phthalocyanine, 20 parts of a grinding aid, and 8 parts of dispersant were put into a kneader, and the phthalocyanine was ground at 60°–120° C. for 7–15 hours in accordance with the corresponding one of prescriptions indicated in Table 2. In this case, when the dispersed system is kneaded at higher temperatures, the α form crystal is liable to be exhibited, and the α form phthalocyanine is liable to decomposition. After confirming with an X-ray diffraction pattern that the α form changed to the τ form, the ground system was taken out of a container and had the grinding aid and the dispersant removed by water and methanol. Thereafter, the product was purified with a 2% aqueous solution of dilute sulferic acid and was filtered, washed with water and dried. Then, a vivid greenish blue crystal was obtained. This crystal was found the τ form metal-free phthalocyanine by X-ray diffraction and infrared spectroscopy.

TABLE 2

| No. of Example | Grinding aid | Dispersant |
|---|---|---|
| 1-A | sodium chloride | polyethylene glycol |
| 1-B | sodium sulfate | polyethylene glycol |
| 1-C | sodium bicarbonate | mixed dispersant consisting of equal amounts of polyethylene glycol and glycerine |

EXAMPLE 2

10 parts of α form metal-free phthalocyanine, 100 parts of a grinding aid and 300 parts of dispersant were charged in a container, and the dispersed system was agitated at 100±30° C. in accordance with the corresponding ones of prescirptions, agitators and conditions indicated in Table 3.

Thereafter, treatments and analyses similar to those of Example 1 were conducted. In any of the samples, the τ form metal-free phthalocyanine was obtained.

TABLE 3

| No. of Ex. | Grinding aid | Dispersant | Agitator | Time (in hour) |
|---|---|---|---|---|
| 2-A | sodium chloride | diethylene glycol monobutyl ether | homomixer | 8–15 |
| 2-B | " | polyethylene glycol | " | " |
| 2-C | sodium sulfate | mixed dispersant consisting of equal amounts of polyethylene glycol and diethylene glycol | disperser | " |
| 2-D | " | mixed dispersant consisting of equal amounts of polyethylene glycol and ethylene glycol monoethyl ether acetate | homomixer | " |
| 2-E | none | ethylene glycol monoethyl ether acetate | disperser | 50 |

EXAMPLE 3

10 parts of α form metal-free phthalocyanine, 100 parts of a grinding aid and 300 parts of dispersant were charged in a sand mill, and the dispersed system was milled at a temperature of 100±20° C. for 15–25 hours in accordance with the corresponding one of prescriptions listed below. Likewise to Example 1, the milled system was taken out after confirming the change of the crystal form, and the product was purified, washed, filtered, dried and analyzed. As a result, any of the samples were confirmed to have the τ form.

TABLE 4

| No. of Ex. | Grinding aid | Dispersant |
|---|---|---|
| 3-A | none | ethylene glycol monomethyl ether acetate |
| 3-B | sodium chloride | ethylene glycol |
| 3-C | sodium sulfate | n-butanol |

EXAMPLE 4

100 parts of metal-free phthalocyanine and 10 parts of each of derivatives indicated in Table 5 and obtained in the same manner as in comparative Example 2 or 3 to be described later, were dissolved in cold 98% sulfuric acid, and the solutions were poured into iced water, and the pracipitates were filtered, washed with water and dried. Thus, a mixture in which both were uniform was obtained. 100 parts of this mixture, 200 parts of pulverized sodium chloride and 80 parts of polyethylene glycol were put into a kneader, and the system was ground at 60°–130° C. for 8 hours.

After the ground system was taken out, it was purified with a 2% aqueous solution of dilute sulfuric acid, and it was filtered, washed with water and dried. Then, a vivid greenish blue crystal was obtained.

This crystal had the X-ray diffraction pattern shown in FIG. 5, and was the η form metal-free phthalocyanine exhibiting the infrared absorption spectrum of Table 1.

TABLE 5

| No. of Ex. | Derivative |
|---|---|
| 4-A | CuPc⫪(COCH$_2$NHC$_2$H$_5$)$_{1.1}$ |
| 4-B | 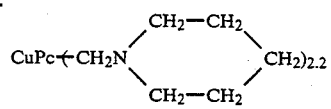 |
| 4-C | CuPc⫪(CH$_2$CH$_2$NHCH$_3$)$_{1.6}$ |
| 4-D | $$CuPc{\dashv}CH_2N\begin{array}{c}CH_2-CH_2\\ \\CH_2-CH_2\end{array}CH_2)_{2.2}$$ |

(In the table, CuPc denotes the copper phthalocyanine residue, and numeral outside parentheses denotes the average number of substituents based on an analysis.)

REFERENCE EXAMPLE 2

A mixture consisting of 15 parts of copper phthalocyanine, 500 parts of trichlorobenzene, 25 parts of acetyl chloride and 70 parts of aluminum chloride was agitated at 60°–80° C. for 8 hours. Thereafter, the mixture was poured into water, and a solid matter was filtered, washed with water and dried. Then, a compound indicated by CuPc-(-COCH$_2$Cl)$_{1.3}$ was obtained.

Amines were reacted with this compound by known methods, whereby various phthalocyanine derivatives were obtained.

REFERENCE EXAMPLE 3

The various phthalocyanine derivatives obtained in Reference Example 2 were reduced by known methods, whereby phthalocyanine derivatives were obtained the general formula of which is represented by:

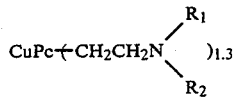

(In the formula, R$_1$ or R$_2$ indicates a hydrogen atom, alkyl group, aryl group or heterocyclic group, and a heterocycle may be formed by a nitrogen atom and R$_1$ or R$_2$.) For example, in reducing a phthalocyanine derivative represented by the following formula:

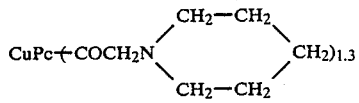

6 parts of potassium hydroxide were dissolved in 80 parts of diethylene glycol, and 6 parts of the above phthalocyanine derivative pulverized to be sufficiently fine were added into the solution. Further, 10 parts of hydrazine hydrate were gradually added, and the resultant solution was circulated for about 10 hours. A deep blue slurry thus obtained was poured into water, and was filtered, washed with water and dried.

EXAMPLE 5

Metal-free phthalocyanine was dissolved in cold 98% sulfuric acid, and was poured into water at or below 20° C. The precipitate was filtered, washed with an aqueous alkaline solution, washed with water and dried, whereby the α form metal-free phthalocyanine was obtained. 100 parts of this α form metal-free phthalocyanine, 10 parts of each of halogenated metal-free phthalocyanine indicated in Table 6 prepared by a conventional method, 200 parts of sodium chloride and 200 parts of polyethylene glycol were charged in an attritor, and the mixed system was ground at 60°–80° C. for 20 hours. After taking out the ground system, it was filtered, washed with water and dried. Then, a vivid greenish blue microcrystal was obtained. This crystal was the η form metal-free phthalocyanine which had the X-ray diffraction pattern shown in FIG. 6 and which exhibited the infrared absorption spectrum in Table 1.

TABLE 6

| No. of Ex. | Derivative |
|---|---|
| 5-A | Pc-(-Cl)$_{4.0}$ |
| 5-B | Pc-(-Br)$_{12.1}$ |

(In Table 6, Pc denotes the metal-free phthalocyanine residue.)

EXAMPLE 6

Metal-free phthalocyanine, copper phthalocyanine (hereinbelow, termed "Cu—Pc"), nickel phthalocyanine (hereinbelow, termed "Ni—Pc") and cobalt phthalocyanine (hereinbelow, termed "Co—Pc"), which were chlorosulfonated by conventional methods, were reacted with various amines. Then, phthalocyanine derivatives indicated in Table 7 were obtained.

TABLE 7

| No. of Ex. | Derivative |
|---|---|
| 6-A | Pc[-SO$_2$-NH-C$_6$H$_4$-SH]$_{1.1}$ [-SO$_2$-NH-NH-C$_6$H$_5$]$_{2.1}$ |
| 6-B | Pc[-SO$_2$-NH-C$_6$H$_3$(F)(SH)]$_{1.2}$ [-SO$_2$-NH-CH$_3$]$_{1.9}$ |
| 6-C | Pc[-SO$_2$-NH-C$_6$H$_3$(SH)(Br)]$_{1.1}$ [-SO$_2$-NH-CH$_3$]$_{2.3}$ [-SO$_3$H]$_{0.9}$ |
| 6-D | CuPc-(-SO$_3$H)$_{0.9}$(-SO$_2$NH-C$_6$H$_5$)$_{2.1}$ |
| 6-E | CuPc-(-SO$_2$NH-C$_6$H$_4$-SO$_3^-$NH$_4^+$)$_{3.5}$ |
| 6-F | NiPc-(-SO$_2$NH-C$_6$H$_{11}$)$_{1.7}$ |
| 6-G | CoPc-(-SO$_2$NHC$_3$H$_7$)$_{0.9}$ |

(In the table, NiPc and CoPc denote the nickel phthalocyanine residue and the cobalt phthalocyanine residue, respectively.)

When the respective phthalocyanine derivatives were treated along with the metal-free phthalocyanine in the same manner as in Example 4, similar greenish blue pigments having the η form crystal were obtained.

EXAMPLE 7

Copper phthalocyanine was chloromethylated and then reacted with various amines, to obtain phthalocyanine derivatives indicated in Table 8. These derivatives were produced by methods known from the Japanese Patent Publication No. 32-5083, etc.

The respective phthalocyanine derivatives indicated in Table 8 were treated along with the metal-free phthalocyanine in the same manner as in Example 4, whereby similar results to those of Example 4 were obtained.

TABLE 8

| No. of Ex. | Derivative |
| --- | --- |
| 7-A | 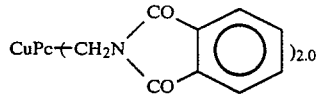 |
| 7-B | 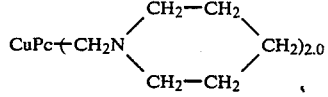 |

EXAMPLE 8

Copper tetrapyridinoporphyrazine was synthesized by a known method.

100 parts of metal-free phthaloycanine and 25 parts of the copper tetrapyridinoporphyrazine were dissolved in concentrated sulfuric acid, and the solution was poured into water. The resultant precipitate was filtered, washed with water and dried, whereby a uniform mixture of fine crystals was obtained.

100 parts of the mixture, 500 parts of sodium chloride and 100 parts of diethylene glycol were put into an attritor, and the mixed system was ground at 90°–100° C. for 8 hours. When after-treatments were performed in the same manner as in Example 4, phthalocyanine having the η form crystal was obtained. This had a great coloring strength.

EXAMPLE 9

100 parts of phthalocyanine and 20 parts of nickel phthalocyanine were dissolved in concentrated sulfuric acid, and the solution was poured into water. The resultant precipitate was filtered, washed with water and dried, whereby a uniform and fine mixture was obtained. 100 parts of the mixture, 1000 parts of steel balls and 500 parts of polyethylene glycol were charged in a pot, and they were subjected to grinding at 90° C. for 24 hours. When after-treatments were conducted, metal-free phthalocyanine having the η form crystal was obtained. This had a great coloring strength. and which exhibited the X-ray diffraction pattern of FIG. 6.

EXAMPLE 10

First, the τ type metal-free phthalocyanine was obtained in accordance with Example 1. Subsequently, (1) 5 parts of the τ type metal-free phthalocyanine, (2) 5 parts of Desmophen #800 trade name of (branched polyester polyol produced by 'Nippon Polyurethane') and (3) 25 parts of cellosolve acetate were kneaded by a porcelain ball mill at the normal temperature for 30 hours, whereupon (4) 8.5 parts of Desmodur N-75 (trade name of hexamethylene diisocyanate produced by 'Nippon Polyurethan') were added to the kneaded system, whereby a coating liquid was prepared. The coating liquid was applied on an aluminum sheet 100 μm thick by bar coating, and was cured at 180° C. for 2 hours. Thus, an electrophotographic recording medium including the dried layer 20 μm thick was obtained.

Electrophotographic characteristics of the above mentioned electrophotographic recording medium were measured as stated below. An electrostatic recording paper tester SP-428 (fabricated by 'Kawaguchi Denki') was set at a dynamic mode, and the voltage of a corona charger was set at plus or minus 5.0 kV. Under these conditions, the recording medium was charged for 10 seconds and was let stand in a dark place for 30 seconds. Thereafter, it was illuminated by a tungsten lamp (2854° K.) of 10 lux (the value of a measurement at a standstill). Meanwhile, the surface potential of the photoconductor was outputted to a recorder, to read the potential $V_o$ (in V) at the end of the charging, the potential $V_{30}$ (in V) after the recording medium was let stand for 30 seconds, and the half-value exposure $E_{50}$ (the quantity of light in lux·s required for $V_{30}$ to reach $V_{30}/2$). Further, in measuring the spectral response, those radiations from a halogen lamp (600 W) which were passed through a spectroscope were used as light sources, and the half-value exposure $E_{50}^\lambda$ (in mJ/m$^2$) versus the wavelength (in nm) was obtained.

In the measurements, under the charging condition of plus 5.0 kV, the electrophotographic recording medium of the present example exhibited (1) the initial potential $V_o=1150$ V, (2) the dark decay rate (dark retentivity) $V_{30}/V_o=95\%$, and (3) the half-value exposure $E_{50}=4.5$ lux·s. These values have shown that the electrophotographic recording medium has a very high sensitivity. Further, the half-value exposure $E_{50}^{800}$ for the radiation of 800 nm (at an intensity of about 20 mW/m$^2$) was found 13 mJ/m$^2$. This value has shown the remarkably enhanced sensitivity of the photoconductor, and it has been known that the spectral response region of the photoconductor extends even to the longer wavelength light.

EXAMPLE 11

(1) 10 parts of α form metal-free phthalocyanine, (2) 100 parts of a grinding aid and (3) 300 parts of dispersant were subjected to a heat treatment at 100±30° C. in accordance with each of prescriptions in Table 9. Thereafter, the treatment was conducted in the same way as in Example 1, then τ form metal-free phthalocyanine.

Each sample of the τ form metal-free phthalocyanine was treated to prepare an electrophotographic recording medium by the same method as in Example 10, and the characteristics of the photoconductor were assessed in conformity with Example 10. The results are as listed in Table 10. It has been found that any of the photoconductors has a high sensitivity and has its spectral response region extended to longer wavelength light.

TABLE 9

| No. of Ex. | Grinding aid | Dispersant | Agitator | Time (in hour) |
| --- | --- | --- | --- | --- |
| 11-A | sodium sulfate | polyethylene glycol | kneader | 7–15 |
| 11-B | sodium bicarbonate | mixed dispersant consisting of equal amounts of polyethylene glycol and glycerine | kneader | 7–15 |
| 11-C | sodium chloride | carbitol | homomixer | 8–15 |

TABLE 9-continued

| No. of Ex. | Grinding aid | Dispersant | Agitator | Time (in hour) |
|---|---|---|---|---|
| 11-D | sodium chloride | polyethylene glycol | homomixer | 8–15 |
| 11-E | sodium sulfate | mixed dispersant consisting of equal amounts of polyethylene glycol and diethylene glycol | disperser | 8–15 |
| 11-F | sodium sulfate | mixed dispersant consisting of equal amounts of polyethylene glycol and ethylene glycol monoethyl ether acetate | homomixer | 8–15 |
| 11-G | none | ethyl acetate | disperser | 50 |

TABLE 10

| No. of Example | Initial potential $V_0$ (V) | Dark decay rate $V_{30}/V_0$ (%) | Half-value exposure for white light $E_{50}$ (lux · s) | Half-value exposure for 800 nm $E_{50}^{800}$ (mJ/m$^2$) |
|---|---|---|---|---|
| 11-A | 1258 | 60 | 4.2 | 12 |
| 11-B | 1120 | 60 | 4.9 | 14 |
| 11-C | 1152 | 56 | 3.8 | 11 |
| 11-D | 1054 | 69 | 4.3 | 13 |
| 11-E | 1053 | 58 | 3.1 | 10 |
| 11-F | 1227 | 51 | 4.9 | 15 |
| 11-G | 1020 | 55 | 4.0 | 12 |

EXAMPLE 12

(1) 10 parts of α form metal-free phthalocyanine, (2) 100 parts of a grinding aid and (3) 300 parts of dispersant were kneaded at 100±20° C. for 15–25 hours in accordance with each of prescriptions in Table 11. Thereafter, the treatment was conducted in the same manner as in Example 1, then, τ form metal-free phthalocyanine was obtained.

Subsequently, a dispersed coating liquid consisting of 2 parts of the τ form metal-free phthalocyanine and 80 parts of tetrahydrofuran was prepared. It was applied on an aluminum sheet 100 μm thick by the use of an applicator, and was dried at 90° C. for 30 minutes. Thus, a charge generating layer which contained the τ form metal-free phthalocyanine and which was 1 μm thick was fabricated.

On this layer, a charge transport layer of each of compositions indicated in Table 11 was stacked. More specifically, the charge transport layer was formed in such a way that a coating liquid having a composition (except Example 12-D) consisting of (1) 2 parts of charge transport material, (2) 2 parts of binder resin and (3) 30 parts of tetrahydrofuran was applied by means of an applicator and was dried at 90° C. for 30 minutes.

In this manner, a laminated recording medium for electrophotography in which the charge transport layer and the charge generating layer were separately disposed.

Next, the characteristics of the samples of the electrophotographic recording medium were measured in the same manner as in Example 10. Measured results are listed in Table 12. In this table, the results of Examples 12-A to 12-D were obtained under the charging condition of minus 5 kV, and that of Example 12-E was obtained under the charging condition of plus 5 kV. It is understood that each of the samples has a very high sensitivity and keeps a high sensitivity even at 800 nm.

Figure 8:
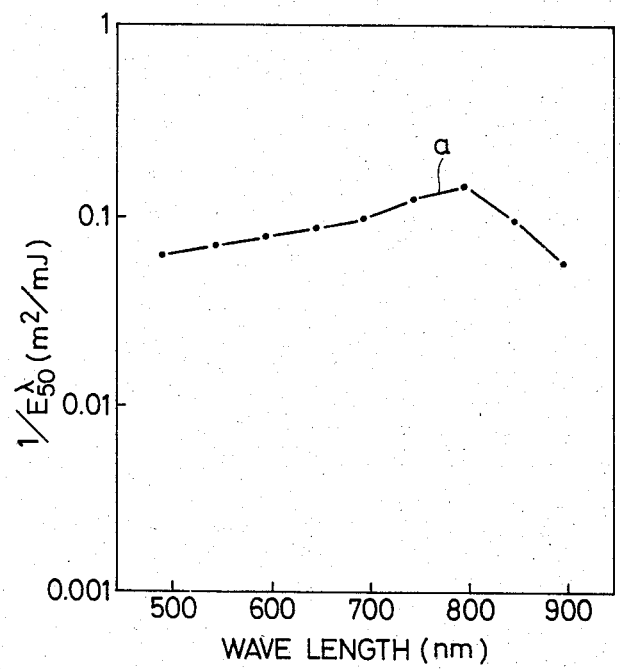
FIG. 8 and FIGS. 10 to 12 are spectral response characteristic diagrams of electrophotographic recording medium according to embodiments of the present invention.

Next, as to the electrophotographic photoconductor of Example 12-A, the values $E_{50}^\lambda$ were measured at many wavelengths other than 800 nm. The results are shown by a curve a in FIG. 8. In this figure, the axis of abscissas represents the wavelength (in nm), while the axis of ordinates is plotted in terms of the inverse numbers of the half-value exposures $E_{50}^\lambda$ at the respective wavelengths. It is understood that the electrophotographic recording medium of the present example has a very high sensitivity in the vicinity of 790–810 nm.

TABLE 11

| No. of Example | Grinding aid | Dispersant | Charge transport material | Binder resin | Thickness of Charge transport layer |
|---|---|---|---|---|---|
| 12-A | none | ethylene glycol monoethyl ether acetate | pyrazoline derivative (ASPP produced by Anan Sangyō) 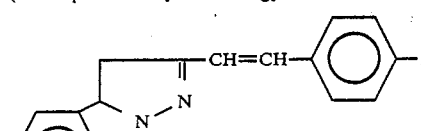 | polycarbonate (Iupilon S2000 produced by Mitsubishi Gasu Kagaku) | 20 |
| 12-B | none | ethylene glycol monoethyl ether | oxadiazole derivative 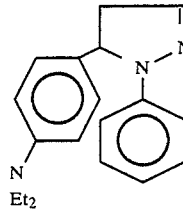 | polyester (Vylon 200 produced by Tōyō Bōseki) | 15 |

TABLE 11-continued

| No. of Example | Grinding aid | Dispersant | Charge transport material | Binder resin | Thickness of Charge transport layer |
| --- | --- | --- | --- | --- | --- |
| 12-C | sodium chloride | ethylene glycol | hydrazone type compound (ABPH produced by Anan Sangyō) 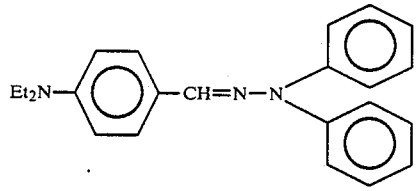 | polyester (Vylon 200 produced by Tōyō Boseki) | 10 |
| 12-D | sodium chlorine | ethylene glycol | poly-N—vinyl carbazole (Tuvicol 210 produced by Anan Sangyō) | none | 10 |
| 12-E | sodium sulfate | carbitol | 2,4,7-trinitrofluorenone | poly-N—vinyl carbazole (Tuvicol 210 produced by Anan Sangyō) | 20 |

TABLE 12

| No. of Example | Initial potential $V_0$ (V) | Dark decay rate $V_{30}/V_0$ (%) | Half-value exposure for white light $E_{50}$ (lux · s) | Half-value exposure for 800 nm $E_{50}^{800}$(mJ/m$^2$) |
| --- | --- | --- | --- | --- |
| 12-A | minus 855 | 41 | 1.5 | 7 |
| 12-B | minus 1180 | 88 | 2.9 | 13 |
| 12-C | minus 555 | 75 | 2.5 | 11 |
| 12-D | minus 627 | 73 | 2.7 | 12 |
| 12-E | 1006 | 54 | 2.7 | 11 |

COMPARATIVE EXAMPLE 1

α form metal-free phthalocyanine (Monolightfastblue GS produced by 'ICI') was purified by extracting it with heated dimethylformamide three times. Thus, the crystal form turned into the β form. Subsequently, the β form metal-free phthalocyanine was dissolved in concentrated sulfuric acid, and the solution was poured into iced water so as to re-precipitate the dissolved matter, whereby the β form was changed to the α form. The re-precipitated matter was washed with aqueous ammonia, methanol, etc., and thereafter dried at 70° C.

Figure 9:
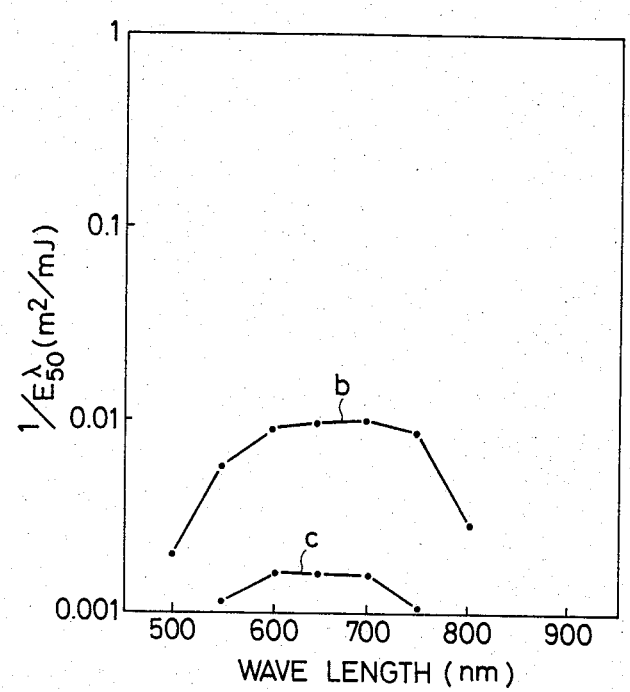
FIG. 9 is a spectral response characteristic diagram of an electrophotographic photoconductor according to a comparative example.

A recording medium for electrophotography was fabricated in quite the same way as in Example 12-A except that the α form or β form metal-free phthalocyanine produced as described above was used instead of the τ form metal-free phthalocyanine. That is, the photoconductor had a structure wherein, on an aluminum sheet 100 μm thick, a charge generating layer made of the α form metal-free phthalocyanine was disposed and was overlaid with a charge transport layer made of the pyrazoline derivative and polycarbonate. When the electrophotographic characteristics and spectral response of this electrophotographic photoconductor were measured in the same way as in Example 12-A, Table 13 below was obtained. The results of Table 13 were obtained under the charging condition of minus 5 kV. Further, when the half-value exposure $E_{50}^\lambda$ was measured at several wavelengths other than 800 nm, results indicated at a curve b or c in FIG. 9 were obtained. The photoconductor exhibited the tendency that its sensitivity lowers drastically in a longer wavelength region of and above 750 nm. Here the curve b indicates the measured results of the sample employing the β form metal-free phthalocyanine and corresponding to Compara. Example 1-b, and the curve c those of the sample employing the α form metal-free phthalocyanine and corresponding to Compara. Example 1-a.

TABLE 13

| No. of comparative example | Initial potential $V_0$ (V) | Dark decay rate $V_{30}/V_0$ (%) | Half-value exposure for white light $E_{50}$ (lux · s) | Half-value exposure for 800 nm $E_{50}^{800}$ (mJ/m$^2$) |
| --- | --- | --- | --- | --- |
| 4-a (using α form) | minus 23 | 5 | >500 | >500 |
| 4-b (using β form) | minus 11 | 37 | 330 |

EXAMPLE 13

100 parts of purified α form metal-free phthalocyanine, 10 parts of phthalocyanine derivative Pc(CONH$_2$-NHC$_2$H$_5$)$_{1.1}$ (where Pc denotes the phthalocyanine nucleus, and numeral outside parentheses denotes the average number of substituents based on an analysis), 200 parts of pulverized sodium chloride and 80 parts of polyethylene glycol were charged in a kneader, and the system was ground at 60°-130° C. for 8 hours. After taking out the ground system, it was purified with a 2% aqueous solution of dilute sulfuric acid and then filtered, washed with water and dried, whereby η form metal-free phthalocyanine was obtained.

Subsequently, a mixture consisting of (1) 12 parts of the η form metal-free phthalocyanine obtained here, (2) 30 parts of branched polyester polyol (Desmophen #800 produced by 'Nippon Polyurethane') and (3) 100 parts of methyl ethyl ketone was kneaded at the normal temperature for 25 hours by means of a porcelain ball mill. Thereafter, 30 parts of HMDI type isocyanate (Desmodur N-75 produced by 'Nippon Polyurethane') were added to the kneaded system. Thus, a coating liquid was prepared. The coating liquid was applied on an aluminum sheet 100 μm thick by bar coating, and was cured at 150° C. for 30 minutes. Then, an electrophotographic recording medium having the dried layer 20 μm thick was obtained.

Electrophotographic characteristics were measured as stated below. The electrostatic recording paper tester SP-428 (fabricated by 'Kawaguchi Denki') was set at the dynamic mode, and the supply voltage of the corona charger was set at plus or minus 5.0 kV. Under these conditions, the photoconductor was charged for 10 seconds and was let stand in a dark place for 30 seconds. Thereafter, it was illuminated by the tungsten lamp (2854° K.) of 10 lux (the value of a measurement at a standstill). Meanwhile, the surface potential of the photoconductor was outputted to the recorder, to read the potential $V_0$ at the end of the charging, the potential $V_{30}$ after the photoconductor was let stand for 30 seconds, and the half-value exposure $E_{50}$ (the quantity of light in lux·s required for $V_{30}$ to reach $V_{30}/2$).

In the measurements of the electrophotographic photoconductor, under the charging condition of plus 5.0 kV, the values of (1) the initial potential $V_0=1200$ V, (2) the dark decay rate $V_{30}/V_0=90\%$, and (3) the half-value exposure $E_{50}=5.0$ lux·s were obtained. These values have shown that the electrophotographic photoconductor has a very high sensitivity.

Subsequently, the spectral response of the photoconductor was measured by the same measuring system as described above except that the radiations of the halogen lamp (600 W) passed through the spectroscope were used as light sources. When the half-value exposure $E_{50}^{800}$ was measured at the wavelength of 800 nm (±1 nm) to be especially noted, it was 15 mJ/m², which has shown that the photoconductor has an extraordinarily enhanced sensitivity to the longer wavelength radiation. The monochromatic light of 800 nm used had an intensity of illumination of about 20 mW/m².

EXAMPLE 14

η form metal-free phthalocyanine was manufactured in the same way as in Example 13 except that the phthalocyanine derivative was each of substances indicated in Table 14.

Electrophotographic recording medium were prepared by the use of the manufactured samples likewise to Example 13, and their electrophotographic characteristics and spectral responses were measured likewise to Example 13. The measured results are indicated in Table 15. It has been found that all the electrophotographic photoconductors have very high sensitivities to white light and the longer wavelength radiation (800 nm).

TABLE 14

| No. of Example | Derivative |
|---|---|
| 14-A | Pc$+$(COCH$_2$NHC$_8$H$_{17}$)$_{1.3}$ |
| 14-B | Pc$+$(COCH$_2$NHC$_2$H$_5$OH)$_{1.3}$ |
| 14-C | Pc$+$(COCH$_2$N(C$_2$H$_5$)$_2$)$_{1.4}$ |
| 14-D | Pc$+$(COCH$_2$NH—⟨C$_6$H$_5$⟩)$_{1.8}$ |
| 14-E | Pc$+$(CH$_2$CH$_2$NH—⟨C$_6$H$_4$—H⟩)$_{1.2}$ |

TABLE 14-continued

| No. of Example | Derivative |
|---|---|
| 14-F | Pc$+$(CH$_2$CH$_2$N(CH$_2$CH$_2$)(CH$_2$CH$_2$))$_{1.6}$ (morpholine ring without O) |
| 14-G | Pc$+$(CH$_2$N(CH$_2$—CH$_2$)(C(=O)—CH$_2$))$_{2.2}$ |
| 14-H | Pc$+$(CH$_2$CH$_2$N(CH$_2$CH$_2$)(CH$_2$CH$_2$)O)$_{2.2}$ |
| 14-I | Pc$+$(CH$_2$CH$_2$NHCH$_3$)$_{1.6}$ |
| 14-J | Pc$+$(Cl)$_{1.1}$, Pc$+$(CH$_2$CH$_2$NH—⟨C$_6$H$_4$—H⟩)$_{1.6}$ |

TABLE 15

| No. of Example | Initial potential $V_0$ (V) | Dark decay rate $V_{30}/V_0$ (%) | Half-value exposure for white light $E_{50}$ (lux·s) | Half-value exposure for 800 nm $E_{50}^{800}$ (mJ/m²) |
|---|---|---|---|---|
| 14-A | 1051 | 86 | 4.7 | 14 |
| 14-B | 1006 | 92 | 4.6 | 14 |
| 14-C | 1063 | 92 | 4.8 | 14 |
| 14-D | 1053 | 92 | 4.6 | 14 |
| 14-E | 1061 | 85 | 4.8 | 14 |
| 14-F | 1095 | 89 | 5.0 | 15 |
| 14-G | 1050 | 94 | 5.2 | 16 |
| 14-H | 1000 | 87 | 5.0 | 15 |
| 14-I | 1041 | 86 | 5.5 | 17 |
| 14-J | 1097 | 91 | 4.8 | 14 |

EXAMPLE 15

η form metal-free phthalocyanine was manufactured in the same way as in Example 13 except that the phthalocyanine derivative was each of substances indicated in Table 16. In the table, Cu—Pc, Ni—Pc and Co—Pc denote phthalocyanine nuclei containing copper, nickel and cobalt, respectively.

TABLE 16

| No. of Ex. | Derivative |
|---|---|
| 15-A | Pc$+$(SO$_2$N(C$_2$H$_5$)$_2$)$_{2.3}$ |
| 15-B | Pc$+$(SO$_2$N(CH$_3$)—⟨C$_6$H$_5$⟩)$_{3.3}$ |
| 15-C | Pc$+$(SO$_2$—NH—⟨C$_6$H$_4$⟩—CH$_3$)$_{3.3}$ |

TABLE 16-continued

| No. of Ex. | Derivative |
|---|---|
| 15-D | Pc$(SO_3H)_{0.5}$ $(SO_2NHCH_2CHClCH_2Cl)_{1.5}$ |
| 15-E | Pc$(SO_2NHC_2H_4$–⟨phenyl⟩–$SO_2C_2H_4N(C_2H_5)$–$C_2H_5)_{3.5}$ |
| 15-F | Cu—Pc$(SO_2H_2)_1$ $(SO_2NH$–⟨phenyl⟩$)_2$ |
| 15-G | Cu—Pc$(SO_2NH$–⟨phenyl⟩–$SO_3^-NH_4^+)_{3.5}$ |
| 15-H | Ni—Pc$(SO_2NH$–⟨cyclohexyl-H⟩$)_{1.7}$ |
| 15-I | Co—Pc$(SO_2NHC_3H_7)_{0.9}$ |

Next, a photoconductor for electrophotography was produced in accordance with a prescription of (1) 3 parts of the η form metal-free phthalocyanine obtained here and (2) 80 parts of tetrahydrofuran. After the composition was dispersed by ultrasonic vibration for 5 minutes, it was applied on an aluminum sheet 100 μm thick by the use of an applicator and then dried at 90° C. for 30 minutes. Thus, a charge generating layer which contained the η form metal-free phthalocyanine and which was 1 μm thick was fabricated.

Subsequently, a coating liquid of a composition consisting of (1) 2 parts of pyrazoline derivative (ASPP produced by 'Anan Sangyo'):

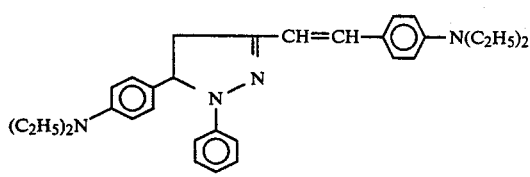

(2) 2 parts of Iupilon S2000 (polycarbonate produced by 'Mitsubishi Gasu Kagaku') and (3) 30 parts of tetrahydrofuran was similarly applied on the previously-applied charge generating layer by an applicator and dried at 90° C. for 30 minutes. In this way, the double-layer electrophotographic recording medium having the charge transport layer as the separate layer was produced.

Figure 10:
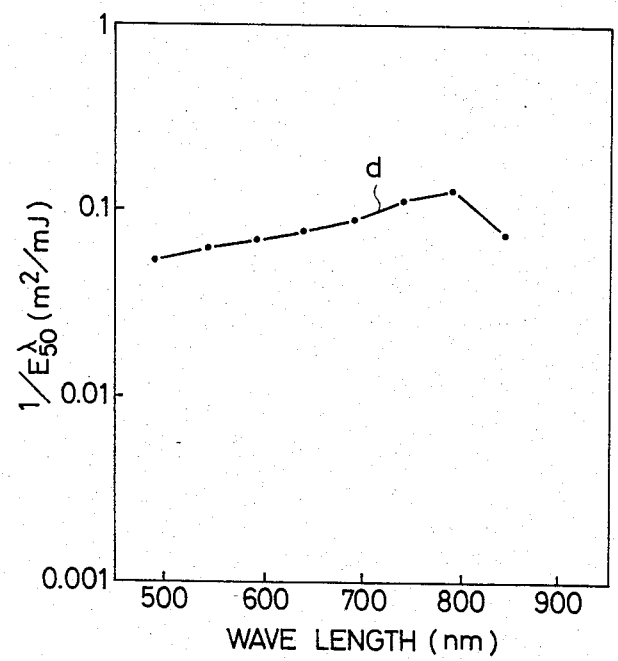
Figure 11:
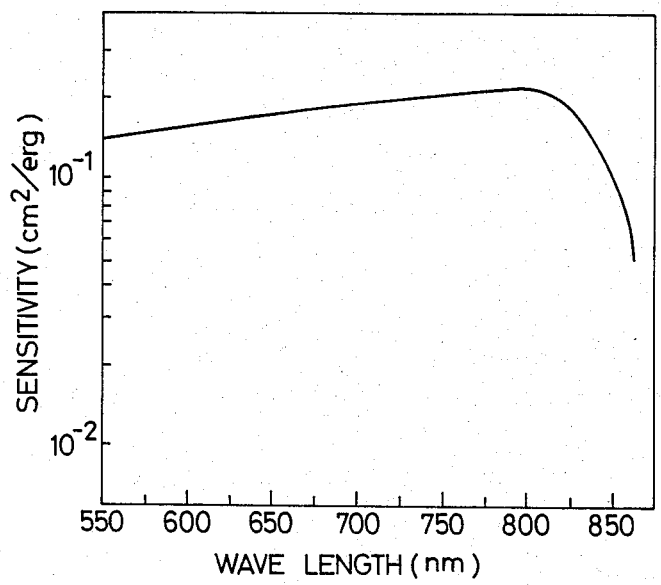
Figure 12:
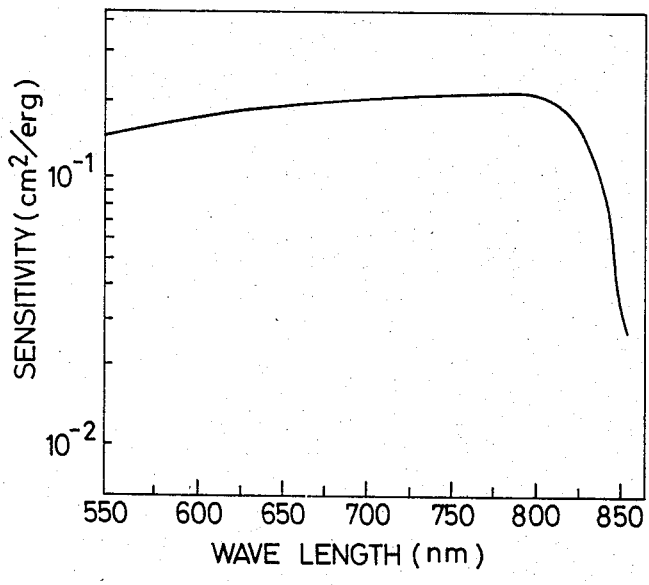

When the electrophotographic characteristics and spectral response of the electrophotographic recording medium were measured under the charging condition of a charger voltage of minus 5 kV by the same method as in Example 13, results listed in Table 17 were obtained, and it has been found that the electrophotographic recording medium has an extraordinarily high sensitivity. Further, when Example 15-A in the table had its half-value exposures $E_{50}^\lambda$ measured for various wavelengths (λ) of 600–850 nm, results at a curve d in FIG. 10 were obtained. In FIG. 10, the axis of abscissas represents the wavelength (in nm), while the axis of ordinates represents the inverse number $E_{50}^\lambda$ ($1/E_{50}^\lambda$ in $m^2/mJ$). As apparent from the figure, the maximum sensitivity appears in the vicinity of 790–810 nm.

TABLE 17

| No. of Example | Initial potential $V_0$ (V) | Dark decay rate $V_{30}/V_0$ (%) | Half-value exposure for white light $E_{50}$ (lux · s) | Half-value exposure for 800 nm $E_{50}^{800}$ ($mJ/m^2$) |
|---|---|---|---|---|
| 15-A | minus 800 | 54 | 1.6 | 8 |
| 15-B | minus 533 | 40 | 2.2 | 11 |
| 15-C | minus 985 | 38 | 1.6 | 8 |
| 15-D | minus 806 | 46 | 1.8 | 9 |
| 15-E | minus 708 | 49 | 2.0 | 10 |
| 15-F | minus 533 | 44 | 1.6 | 7 |
| 15-G | minus 878 | 46 | 2.0 | 9 |
| 15-H | minus 985 | 42 | 1.8 | 9 |
| 15-I | minus 861 | 49 | 2.3 | 12 |

EXAMPLE 16

η form metal-free phthalocyanine was manufactured in the same way as in Example 13 except that the phthalocyanine derivative was each of substances indicated in Table 18.

Next, using the η form metal-free phthalocyanine, a photoconductor for electrophotography was manufactured in accordance with a prescription of (1) 5 parts of the η form metal-free phthaloycanine, (2) 500 parts of Tuvicol 210 (poly-N-vinyl carbazole produced by 'Anan Sangyo'), (3) 15 parts of 2,4,7-trinitrofluorenone, (4) 2 parts of DC11PA (leveling agent produced by 'Tore Shirikon') and (5) 40 parts of tetrahydrofuran.

TABLE 18

| No. of Ex. | Derivative |
|---|---|
| 16-A | Pc—$Cl_{4.0}$ |
| 16-B | Pc—$Br_{12.1}$ |
| 16-C | Pc—$I_{7.5}$ |
| 16-D | Pc—$F_{10.3}$ |
| 16-E | Pc$(CH_2N(CO)_2$⟨phenyl⟩–$NO_2)_{1.4}$ |
| 16-F | Pc$(CH_2N(C_2H_5)(C_2H_5))_{2.0}$ |
| 16-G | Pc$(CH_2NH$–⟨phenyl⟩–$CH_3)_{2.0}$ |

Figure 13:
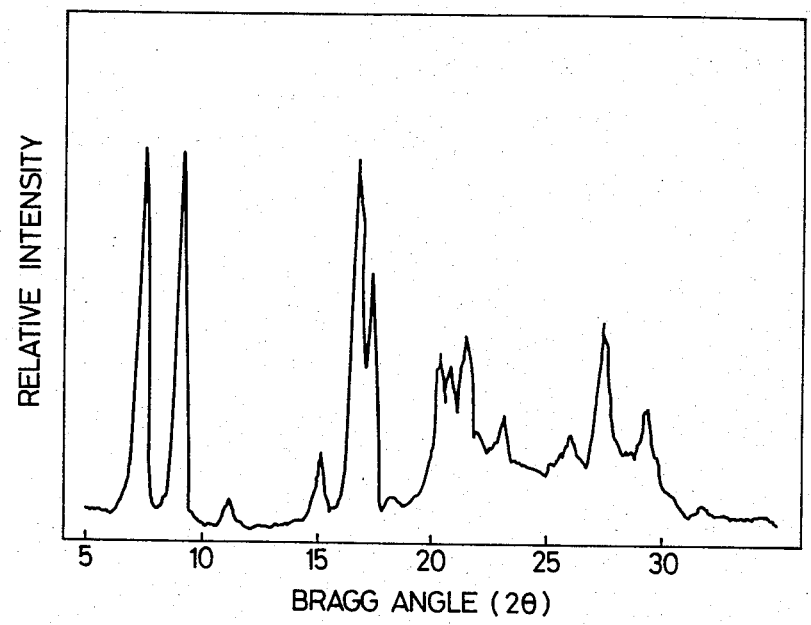
FIG. 13 and FIGS. 14 and 15 show X-ray diffraction patterns of τ' and η' form metal-free phthalocyanines, respectively.

FIG. 13 shows the X-ray diffraction pattern of the products.

TABLE 20

| No. of Ex. | Grinding aid | Dispersant | Agitator | Time (in hour) |
|---|---|---|---|---|
| 17-A | sodium chloride | diethylene glycol monobutyl ether | homomixer | 6–13 |
| 17-B | " | polyethylene glycol | " | " |
| 17-C | sodium sulfate | mixed dispersant consisting of equal amounts of polyethylene glycol and diethylene glycol | disperser | " |
| 17-D | " | mixed dispersant consisting of equal amounts of polyethylene glycol and ethylene glycol monoethyl ether acetate | homomixer | " |
| 17-E | none | ethylene glycol monoethyl ether acetate | disperser | 35 |

TABLE 18-continued

| No. of Ex. | Derivative |
|---|---|
| 16-H | Pc$\{$CH$_2$—N$\bigcirc\}_{2.0}$ |
| 16-I | Pc$\{$CH$_2$N(CH$_2$—CH$_2$)$_2$CH$_2\}_{2.0}$ |

In the above composition, the Tuvicol 210 was sufficiently dissolved in the tetrahydrofuran in advance, and the other constituents were added to the solution. The resultant solution was dispersed by ultrasonic vibration for 5 minutes, to prepare a coating liquid. The coating liquid was applied on an aluminum 100 μm thick by an applicator and then dried at 90° C. for 30 minutes, whereby an electrophotograhic photoconductor 8 μm thick was obtained.

When the electrophotographic photoconductor had its electrophotographic characteristics and spectal responce measured likewise to Example 13, results listed in Table 19 were obtained, and it has been found that the electrophotographic photoconductor has an extraordinarily high sensitivity. The results of Table 19 correspond to the charging condition of plus 5.0 kV.

TABLE 19

| No. of Example | Initial potential $V_0$ (V) | Dark decay rate $V_{30}/V_0$ (%) | Half-value exposure for white light $E_{50}$ (lux · s) | Half-value exposure for 800 nm $E_{50}^{800}$ (mJ/m$^2$) |
|---|---|---|---|---|
| 16-A | 750 | 43 | 4.5 | 14 |
| 16-B | 541 | 64 | 3.7 | 12 |
| 16-C | 640 | 70 | 2.7 | 8 |
| 16-D | 726 | 30 | 3.7 | 11 |
| 16-E | 326 | 51 | 4.8 | 15 |
| 16-F | 426 | 51 | 2.7 | 9 |
| 16-G | 687 | 31 | 4.1 | 13 |
| 16-H | 640 | 56 | 2.7 | 8 |
| 16-I | 739 | 63 | 5.1 | 16 |

EXAMPLE 17

10 parts of α form metal-free phthalocyanine, 200 parts of a grinding aid and 300 parts of dispersant were charged in a container, and the dispersed system was agitated at 100±30° C. in accordance with the corresponding ones of prescirptions, agitators and conditions indicated in Table 20.

Thereafter, treatments and analyses similar to those of Example 1 were conducted. In any of the samples, the τ' form metal-free phthalocyanine was obtained.

EXAMPLE 18

10 parts of α form metal-free phthalocyanine, 600 parts of 9 grinding aid and 300 parts of dispersant were charged in a sand mill, and the dispersed system was milled at a temperature of 100±20° C. for 15–25 hours in accordance with the corresponding one of prescriptions listed below. Likewise to Example 1, the milled system was taken out after confirming the change of the crystal form, and the product was purified, washed, filtered, dried and analyzed. As a result, any of the samples were confirmed to have the τ' form.

TABLE 21

| No. of Ex. | Grinding aid | Dispersant |
|---|---|---|
| 18-A | none | ethylene glycol monomethyl ether acetate |
| 18-B | sodium chloride | ethylene glycol |
| 18-C | sodium sulfate | n-butanol |

EXAMPLE 19

Metal-free phthalocyanine was dissolved in iced 98% sulfuric acid, and was poured into water at or below 20° C. The precipitate was filtered, washed with alkali, washed with water and dried, whereby the α form metal-free phthalocyanine was obtained. 200 parts of this α form metal-free phthalocyanine, 10 parts of each of halogenated metal-free phthalocyanines shown in Table 22 prepared by a conventional method, 200 parts of sodium chloride and 200 parts of polyethylene glycol were put into an attritor, and the mixed system was ground at 100°–120° C. for 20 hours. After taking out the ground system, it was filtered, washed with water and dried. Then, a vivid greenish blue microcrystal was obtained. This crystal was the η' form metal-free phthalocyanine which had the X-ray diffraction pattern shown in FIG. 14 and which exhibited the infrared absorption spectrum in Table 1.

TABLE 22

| No. of Ex. | Derivative |
|---|---|
| 19-A | Pc$\{$Cl$\}_{4.0}$ |
| 19-B | Pc$\{$Br$\}_{12.1}$ |

(Pc denotes the metal-free phthalocyanine residue.)

EXAMPLE 20

The same experiments were conducted in accordance with the procedures of Example 4, except that 400 parts of sodium salt and 100 parts of polyethylene glycol were used. The products of the experiments were the modified η form phthalocyanine (η' form), which had the X-ray differation pattern shown in FIG. 15, and which exhibited the infrared adsorption spectrum shown in Table 1.

EXAMPLE 21

The same experiments were conducted in accordance with the procedures of Example 9, except that the mixture was milled at 100° C. for 40 hours. The products were the modified η form phthalocyanine (η' form), which is the same as in Example 19.

According to the present invention, there is provided an electrophotographic recording medium having a high sensitivity to the radiation of a semiconductor laser. Thus, the invention is appropriately applied to recording medium for a copying machine and a semiconductor laser beam printer.

The new charge generating substances proposed by the present invention should be disperesed homogeneously in the cured resinous binder to obtain satisfactory results. An amount of the charge generating substance in the layer should preferably be 20 to 200 parts by weight per 100 parts by weight of the binder.

In the composite type recprding medium, the first layer of the charge transport material should preferably have a thickness of 5 to 100 μm and the second layer of the charge generating material should preferably have a thickness of 20 μm or less. However, the above conditons are not essential for the present invention.

The most preferable thickness of the first layer is 8 to 30 μm, and the most preferable thickness of the second layer is 0.1 to 3 μm.

In order to avoide the lowering of sensitivity of the second layer, the thickness should be so small that the second layer is substantially transparent to the light having a wavelength of from 500 to 800 μm.

What is claimed is:

1. A recording medium for electrophotography comprising a thin layer containing an effective amount of a metal-free phthalocyanine selected from the group consisting of τ, τ', η, η' form metal-free phthalocyanine and mixtures thereof, and an electroconductive substrate supporting the layer.

2. A recording medium for electrophotography as defined in claim 1, wherein the layer further contains another charge generating substance which is photosensitive to the light.

3. A recording medium for electrophotography comprising a thin layer containing an effective amount of τ form metal-free phthalocyanine or τ' form metal-free phthalocyanine which is obtained in such a way that α form metal-free phthalocyanine is dispersed in a liquid dispersant; while the dispersed system is heated to a temperature lower than a decomposition temperature of the phthalocyanine, mechanical shearing forces are applied to the dispersed phthalocyanine particles, to change a crystalline structure thereof, and an electroconductive substrate supporting the layer thereon.

4. A recording medium for electrophotography as defined in claim 3, wherein said liquid dispersant in an aliphatic compound.

5. A recording medium for electrophotography comprising a thin layer containing an effective amount of η form or η' form metal-free phthalocyanine which is obtained in such a way that a mixture is dispersed in a liquid dispersant, said mixture comprising (A) 100 parts by weight of metal-free phthalocyanine and (B) at most 50 parts by weight of at least one, metal-free phthalocyanines; while the dispersed system is heated to a temperature lower than a decomposition temperature of the above-mentioned mixture, mechanical shearing forces are applied to this mixture, to change a crystalline structure thereof, and an electroconductive substrate supporting the layer thereon.

6. A recording medium for electrophotography as defined in claim 5 wherein said liquid dispersant is an aliphatic compound.

7. A composite recording medium for electrophotography comprising a layer containing a charge generating substance and a charge transport substance, said layer being disposed on an electroconductive substrate, wherein said charge generating substance contains at least one member selected from the group consisting of τ, τ', η and η' form metal-free phthalocyanine metal-free phthalocyanine.

8. A composite recording medium for electrophotography as defined in claim 7, wherein said charge generating substance and charge transport substance are homogeneously dispersed in a cured resinous binder.

9. A composite recording medium as defined in claim 8, wherein an amount of the charge generating substance is 20 to 200 parts by weight per 100 parts by weight of the binder.

10. A composite recording medium as defined in claim 7, wherein a first layer containing the charge transport substance has a thickness of 5 to 100 μm and a second layer containing the charge generating substance, beneath said first layer and on the substrate, has a thickness of 20 μm or less.

11. A composite recording medium as defined in claim 10, wherein the first layer has a thickness of 8 to 30 μm and the second layer has a thickness of 0.1 to 3 μm.

12. A composite recording medium as defined in claim 10, wherein the first layer is substantially transport to the light having wavelength of from 500 to 800 nm.

13. A recording medium for electrophotography comprising an electroconductive substrate, and a thin layer, supported on the substrate, containing an effective amount of a metal-free phthalocyanine selected from the group consisting of τ-form metal-free phthalocyanine, τ'-form metal-free phthalocyanine and a mixture thereof, wherein τ-form and τ'-form metal-free phthalocyanines are characterized by intense lines at Bragg angles (2θ±0.2 degrees) of 7.6, 9.2, 16.8, 17.4, 20.4 and 20.9, and 7.5, 9.1, 16.8, 17.3, 20.3, 20.8 and 27.4, respectively.

14. A recording medium for electrophotography comprising an electroconductive substrate, and a thin layer, supported on the substrate, containing an effective amount of a metal-free phthalocyanine selected from the group consisting of η-form metal-free phthalocyanine, η'-form metal-free phthalocyanine and a mixture thereof, wherein the η- and η'-form metal-free phthalocyanines each comprises 100 parts by weight of a metal-free phthalocyanine and up to 50 parts by weight of at least one of a metal-free phthalocyanine having a substituent for benzene nuclei, a porphin-type compound, a metal phthalocyanine which may have a substituent for benzene nuclei, and the η-form and η'-form are characterized by intense lines at Bragg angles (2θ±0.2 degrees) of 7.6, 9.2, 16.8, 17.4 and 28.5, and 7.5, 9.1, 16.8, 17.3, 20.3, 20.8, 21.4 and 27.4, respectively.

15. A recording medium according to claim 14, wherein η- and η'-form metal-free phthalocyanines are further characterized by having additional intense lines of 21.5 and 27.5, and 22.1 and 28.5, respectively.

* * * * *